(12) United States Patent
Dachs

(10) Patent No.: US 8,902,804 B2
(45) Date of Patent: Dec. 2, 2014

(54) METHODS OF BROADCASTING TO TERMINALS IN A WIRELESS NETWORK

(75) Inventor: Andrew Francis Dachs, Christchurch (NZ)

(73) Assignee: Tait Limited, Christchurch (NZ)

( * ) Notice: Subject to any disclaimer, the term of this patent is extended or adjusted under 35 U.S.C. 154(b) by 33 days.

(21) Appl. No.: 13/185,498

(22) Filed: Jul. 18, 2011

(65) Prior Publication Data

US 2012/0014310 A1 Jan. 19, 2012

Related U.S. Application Data

(60) Provisional application No. 61/427,096, filed on Dec. 23, 2010.

(30) Foreign Application Priority Data

Jul. 19, 2010 (NZ) ........................................ 586889

(51) Int. Cl.
| | |
|---|---|
| H04H 20/71 | (2008.01) |
| H04L 12/28 | (2006.01) |
| H04J 3/26 | (2006.01) |
| H04L 1/18 | (2006.01) |
| H04L 1/14 | (2006.01) |
| H04W 4/06 | (2009.01) |

(52) U.S. Cl.
CPC ........................................ *H04W 4/06* (2013.01)
USPC ........... 370/312; 370/390; 370/432; 714/748; 714/749; 714/750

(58) Field of Classification Search
CPC ...... H04W 4/06; H04W 72/005; H04L 12/18; H04L 12/185; H04L 1/189; H04L 1/1812
USPC ................... 370/312, 390, 432; 714/748–751
See application file for complete search history.

(56) References Cited

U.S. PATENT DOCUMENTS

| | | | |
|---|---|---|---|
| 2005/0216812 A1* | 9/2005 | Leon et al. ..................... | 714/748 |
| 2006/0069802 A1* | 3/2006 | Vedantham et al. .......... | 709/233 |
| 2007/0147437 A1* | 6/2007 | Yasui et al. ................... | 370/519 |

* cited by examiner

*Primary Examiner* — Un C Cho
*Assistant Examiner* — Jeremy Costin
(74) *Attorney, Agent, or Firm* — Dentons US LLP

(57) ABSTRACT

A method of broadcasting a file to terminals in a wireless network, such as a mobile radio network. The file is divided into a set of blocks which are to be transmitted to the terminals. An interval for response by the terminals is calculated depending on the number of active terminals which require the blocks. Messages containing the blocks and the response interval are then broadcast over the network. Responses indicating missing or imperfect blocks are received from the terminals. These steps are repeated until all of the terminals have received a complete set of blocks or have become inactive. Shorter response intervals are calculated as the number of active terminals is reduced.

11 Claims, 9 Drawing Sheets

| TERMINAL ID | STATUS | UPDATED |
|---|---|---|
| 1001 | active | no |
| 1002 | inactive | no |
| 1003 | active | no |
|  |  |  |
|  |  |  |
|  |  |  |
|  |  |  |
|  |  |  |
|  |  |  |
|  |  |  |
| 1450 | active | no |

| BLOCK | # HOLES |
|---|---|
| 0 | 4 |
| 1 | 13 |
| 2 | 7 |
|  |  |
|  |  |
|  |  |
| N | 0 |

METHODS OF BROADCASTING TO TERMINALS IN A WIRELESS NETWORK

RELATED APPLICATIONS

This application is a NONPROVISIONAL of, incorporates by reference and claims priority to NZ 586889, filed 19 Jul. 2010, and U.S. Provisional Application 61/427,096, filed 23 Dec. 2010, each of which are assigned to the assignee of the present invention.

FIELD OF THE INVENTION

This invention relates to methods of broadcasting to wireless terminals, including a method for broadcasting a file when updating mobile radios.

BACKGROUND

A mobile radio network may include hundreds or possibly thousands of wireless terminals each of which requires updating with software or data files from time to time. Terminals are preferably updated over the air using a broadcast protocol, rather than being manually brought to a central site or visited individually at remote sites. The same or similar files can usually be transmitted to each terminal.

Private mobile radio (PMR) networks typically provide a relatively small number of broadcast channels each with relatively narrow bandwidth, compared to wired or spread spectrum systems for example. In many cases the networks are also unreliable or lossy in that signals to some or all of the wireless terminals are imperfectly received for various reasons. These terminals may then request multiple repeats of a particular transmission.

Files should therefore be transmitted on the downlink to the terminals as efficiently as possible and repeat transmissions of all or part of each file must be managed. Contention between the terminals on the uplink when acknowledging receipt of the files must also be efficiently managed.

SUMMARY OF THE INVENTION

It is an object of the invention to provide improved methods for broadcasting data to wireless terminals, or at least to provide an alternative to existing broadcast methods.

In one aspect the invention resides in a method of broadcasting a file to terminals in a wireless network, including: dividing the file into a set of blocks, calculating a current response interval based on a number of active terminals which require blocks, transmitting information relating to the response interval to the terminals, transmitting blocks to the terminals, receiving responses from the terminals, within the response interval, relating to missing or imperfect blocks, determining from the responses which blocks are still required by one or more of the terminals, and repeating until substantially all of the terminals have received a complete set of blocks or are inactive.

Preferably each new response interval is shorter than the previous interval as the number of active terminals is reduced. Response intervals may be calculated as proportional to the number of active terminals. New response intervals may be transmitted in command messages which are sent separately from messages containing the blocks. Some or all of the active terminals respond randomly within the current response interval. Terminals which do not respond within a predetermined number of response intervals are considered inactive.

Preferably response messages from active terminals include "update complete" or "update end" messages after which the respective terminal is considered inactive.

The invention may also be said to reside in a management computer which operates as defined above, and in a wireless terminal for a mobile radio network which is used in a method as defined above.

BRIEF DESCRIPTION OF THE DRAWINGS

Preferred embodiments of the invention will be described with respect to the accompanying drawings, of which.

DETAILED DESCRIPTION

Figure 1:
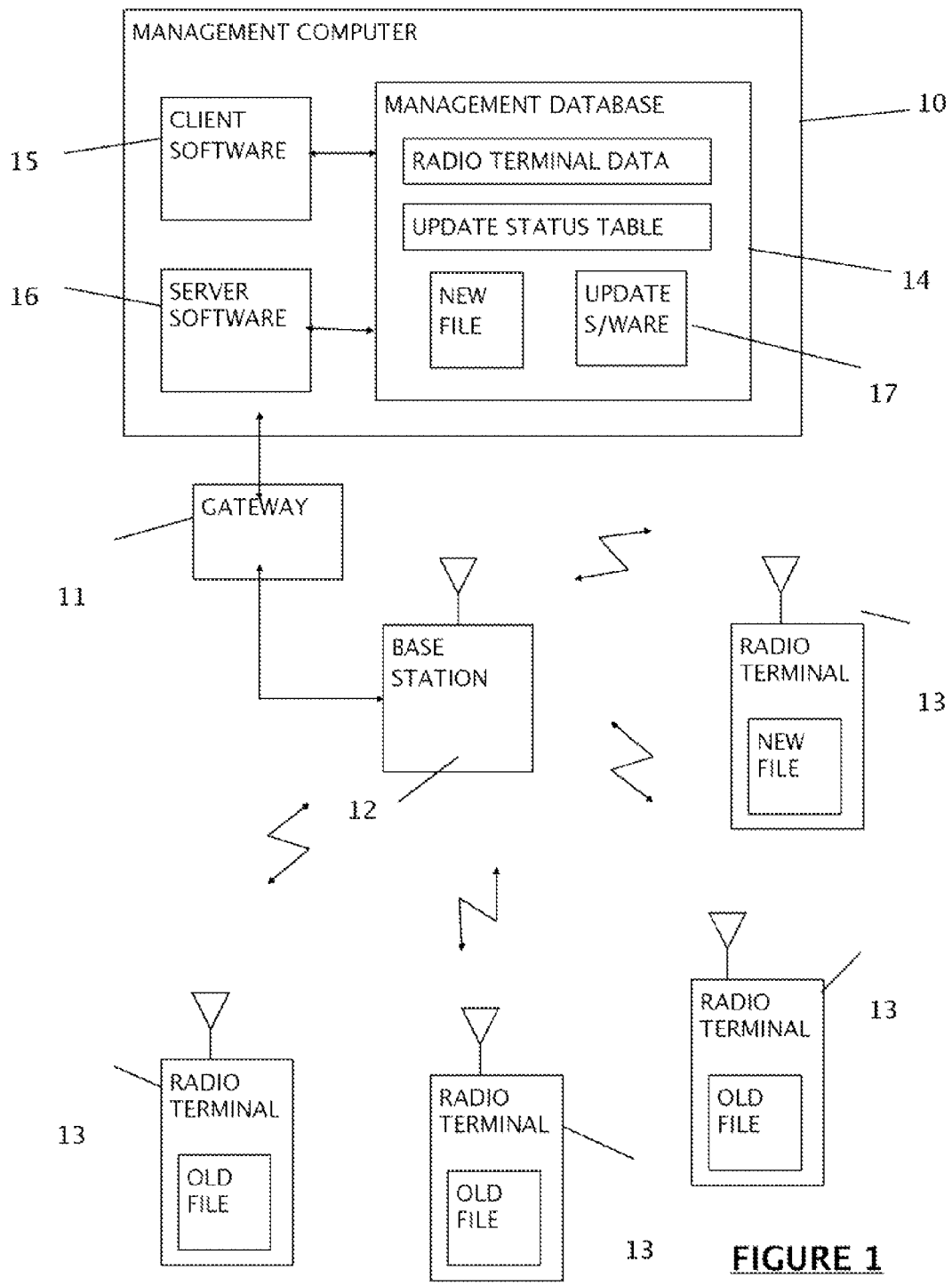
FIG. 1 schematically shows a network with wireless terminals to be updated.

Referring to the drawings it will be appreciated that the invention may be implemented in a variety of different ways, for a range of different wireless networks. The embodiments described here are given by way of example only. The invention may also be suitable for some wired networks.

FIG. 1 shows a simple radio network having a central management computer 10 connected through a gateway 11 to a base station 12. Radio signals are transmitted between mobile terminals 13 and the base station using one or more RF channels. A range of bearer protocols such as P25, DMR or IP may be involved. A network of this kind could involve several central computers of different kinds, dozens of base stations in many different arrangements, and a fleet of up to a thousand or more mobile terminals in use over a wide geographical area. The terminals may be used individually but are also typically assigned to one or more user groups. The management computer includes a memory which stores software instructions and one or more processors which carry out the instructions. The terminals also each include a memory which stores software instructions and one or more processors which carry out the instructions.

Each mobile terminal 13 in FIG. 1 contains software and data files which may be up-dated using an over the air programming (OTAP) system located in the management computer 10. A management database 14 stores status data relating to the terminals, including group information and copies of the old files which are currently being used by each terminal. An operator uses client software 15 in the management computer to determine when updates are required and to create new files for the terminals. Server software 16 then carries out an update process using a broadcast protocol which sends the new files to the terminals where they are used to patch or replace one or more existing files. An update process 17 is typically carried out in relation to a single file and a single group of terminals. Terminals which are participating in a current process are said to be "active". Terminals which are in a relevant group but are not participating for some reason, such as being outside the network coverage area or turned off, are said to be "inactive". A terminal may change between active and inactive during a particular update process. A process may be deemed complete when all or nearly all of the active terminals have received the new file, and a fresh process may be required for terminals which are inactive at that time.

Figures 2, 3, 4:
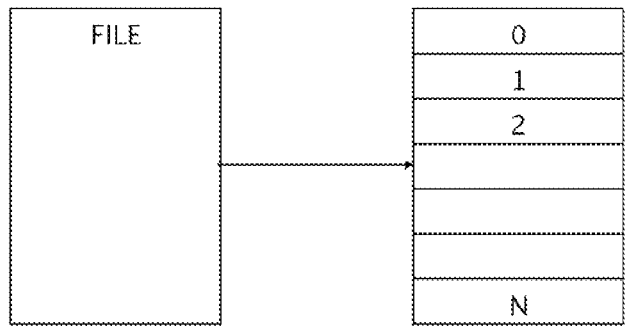
FIG. 2 shows division of a file into blocks for broadcasting to the terminals in an update process.
FIG. 3 is a table listing the status of active and inactive terminals during the update process.
FIG. 4 is a table listing blocks which have not yet been received by all of the terminals.

FIG. 2 shows how a new file may be divided into a set of blocks for transmission to the terminals 13 in FIG. 1. In this example there are N+1 blocks of equal size. Each file is assigned a System Unique File Identifier (SUFI) which is distinctive within the OTAP system. The SUFI or a suitably shortened version of the SUFI are then added to a series of standard messages, typically datagrams, which are sent to and from the terminals during an update process involving the particular file. Once an update process has been initiated each terminal maintains a list of blocks which have been received by that terminal during the process, or alternatively a list of blocks which have not been received. Information about missing or incomplete blocks is sent by the terminals to the management computer and used to determine which blocks are required to be retransmitted.

The network in FIG. 1 uses a range of different messages for communication between the management computer 10 and the terminals 13 during an update process. Messages sent to the terminals by the management computer typically include command messages and block messages. Command messages contain information such as the number of blocks in the file, the size of the blocks, and a response interval for acknowledgements. They may be repeated from time to time so that previously inactive terminals can join the process. Block messages are sent more often and contain one or more blocks in accord with the command messages. Messages sent by the terminals to the management computer include acknowledgements, update complete messages, and update end messages. Acknowledgements are preferably sent only in response to the command messages and contain the information about missing blocks. A terminal may be deemed inactive if a response has not been received within a predetermined number of response intervals. An update complete message indicates that the respective terminal has received a full set of blocks. An update end message indicates that the terminal does not have a full set but can no longer participate in the process.

FIGS. 3 and 4 show status tables which may be maintained by the management computer 10 in FIG. 1 to record the progress of an update process. In this example a file is divided into blocks and broadcast to a group containing 450 terminals. The blocks are initially sent in order and most blocks usually need to be repeated depending on the number of missing blocks or "holes" which are still required by individual terminals. The management computer combines responses from the terminals to determine an overall list of holes. A process of this kind may require most blocks to be transmitted about three times and take from several minutes up to an hour or more to complete in a typical radio network. FIG. 3 shows which of the terminals are currently active and which have been fully updated at this stage of the process. FIG. 4 shows a list of blocks and the running tally of the number of holes which have been reported by the terminals. Retransmission of blocks to fill the holes is prioritised according to the number of terminals which have requested each block.

The terminals 13 in FIG. 1 are generally required to respond to the command messages in order to indicate which terminals are still active in the current update process, and also to provide the information about missing or imperfect blocks. The responses can be collected efficiently by introducing a random delay within a dynamic or adaptive response interval. If the interval is too short there will be too many collisions between individual response messages. If the interval is too long the delays will be unnecessary, and the system may become unresponsive. An interval which depends on the number of active terminals and decreases with the number of terminals is preferred. It is considered possible to achieve an exponential decrease in the response interval towards the end of an update process so that the time taken to send a file to multiple terminals can be made proportional to the log of the number of terminals.

An interval which is proportional to the number of terminals may be calculated using the formula: $3gt/a$, where g is the approximate number of active terminals, t is the time required to transmit a response, and a is the fraction of the uplink available to the update process. The factor of three allows for a maximum utilisation of 33% for a random access channel. For example, in a group with 100 active terminals, each requiring 75 ms to transmit a response, and with 50% of the uplink available, a response interval of about 45s could be used.

Figure 5A:
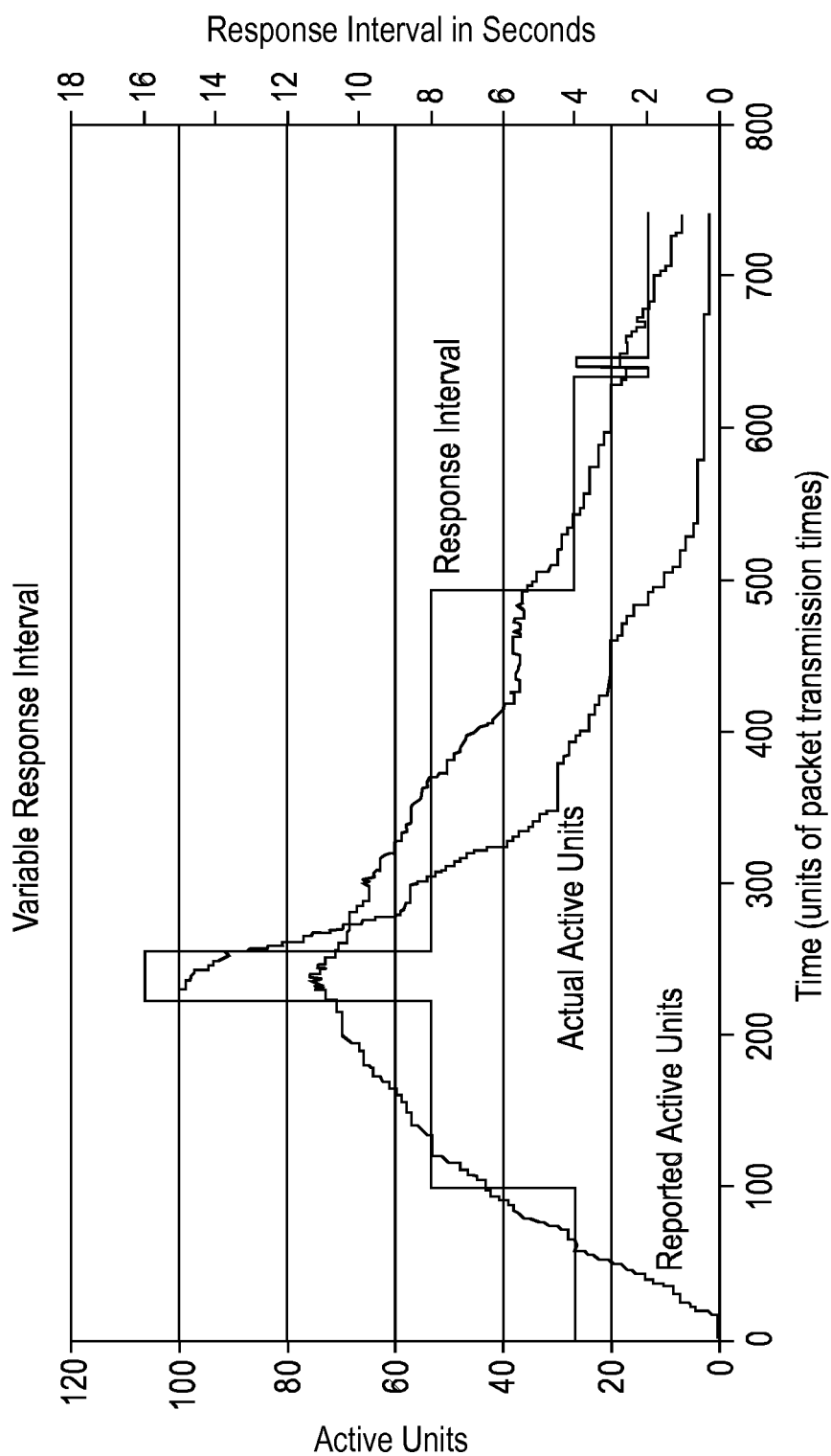
FIGS. 5a, 5b, 5c are graphs indicating the number of active terminals during simulated update processes.

FIG. 5a is a graph showing the result of a simulated update process. The simulation was carried out using an initial group of 100 active terminals receiving a file formed by 100 blocks, and 50% availability of the uplink for responses. The time required to transmit a response following carrier sensing on the RF channel was assumed to be 10 ms. The system calculates initial response intervals of about 4 s and 8 s which are generally too short to allow the terminals to respond without collisions. The number of active terminals and the missing blocks cannot be properly determined when the interval is too short, so the system automatically increases the interval. When the interval increases to about 16 s the active terminals are all able to respond. Thereafter the number of terminals decreases towards zero as their full sets of blocks are received.

Figure 5B:
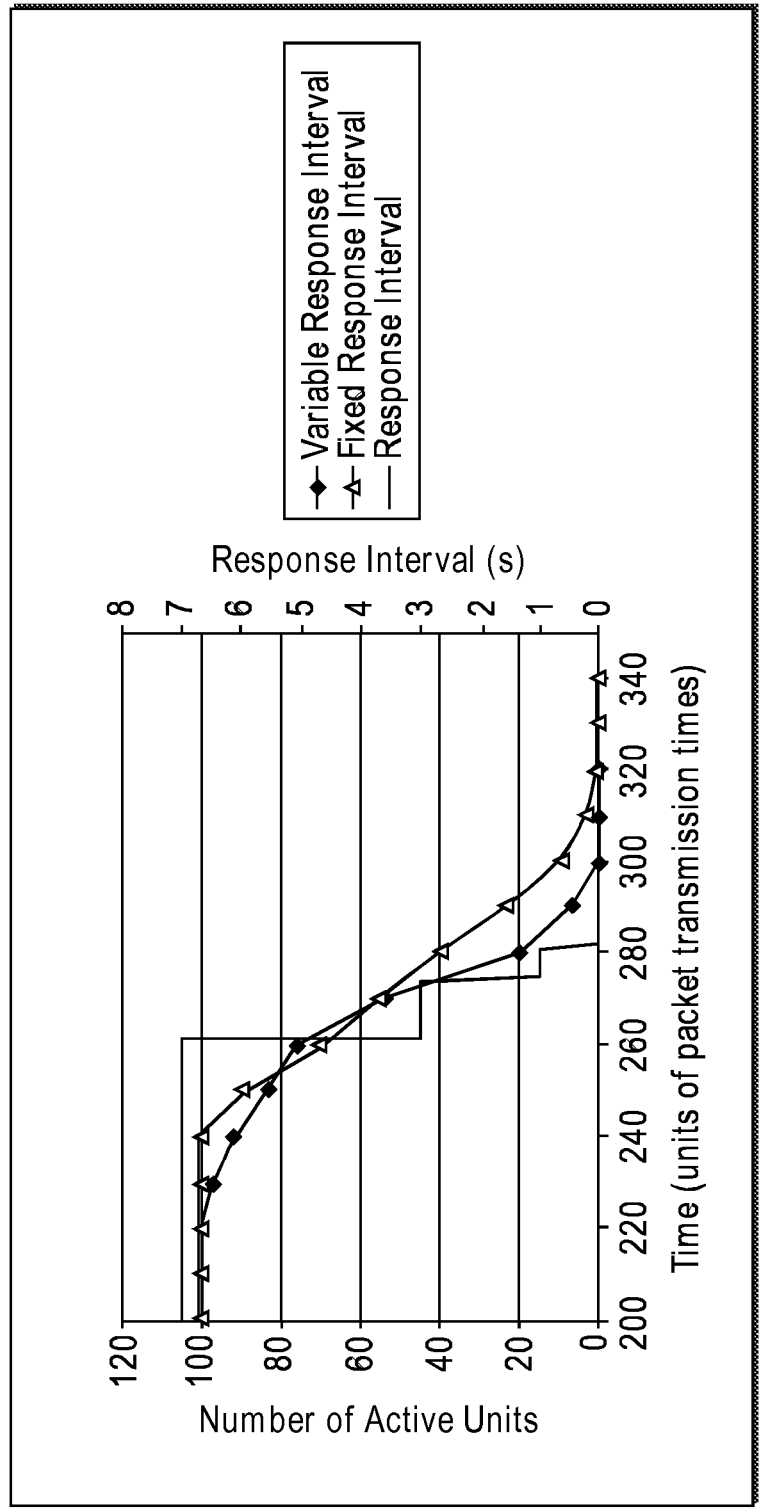

FIG. 5b is a further graph showing a simulated update process, using similar parameters to FIG. 5a. The graph includes data comparing fixed and variable response intervals in separate curves. In the case of a variable interval, the system begins the process and calculates the interval using the actual number of 100 active terminals. The interval decreases from 7 s to 3 s, then 1 s and eventually reaches zero when all active terminals have been updated. The number of active terminals decreases to zero about 10% sooner when a variable interval is used.

Figure 5C:
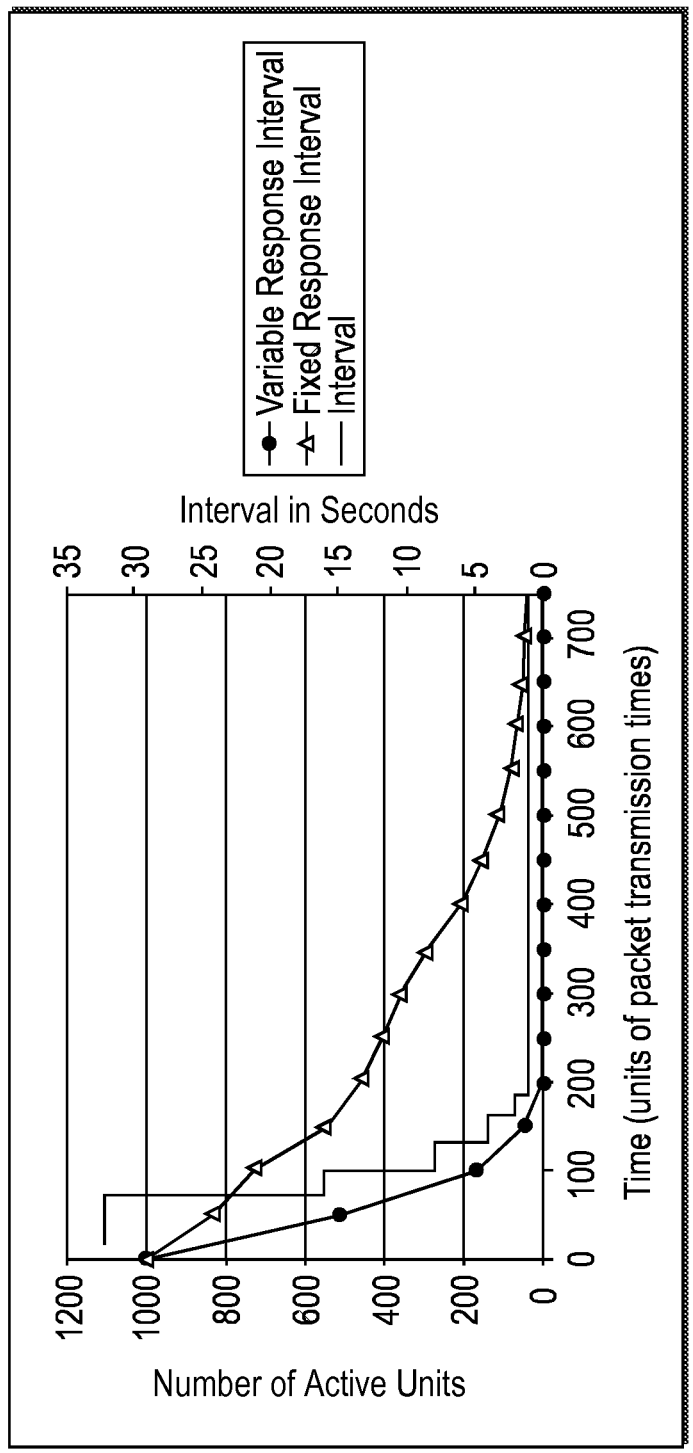

FIG. 5c is a further graph showing a simulated update process using parameters different to FIGS. 5a and 5b, and comparing the progress of systems using fixed and variable intervals. In this case the file to be transferred has a relatively small number of blocks being broadcast to a relatively large number of terminals, namely 10 blocks and 1000 terminals. A 10% message error rate for reception of blocks by the terminals was also included. The response interval decreases from 33 s through approximately 16 s, 7 s, 3 s, 2 s to zero. The number of active terminals reaches zero at least 3× faster than when a fixed interval is used.

Figure 6:
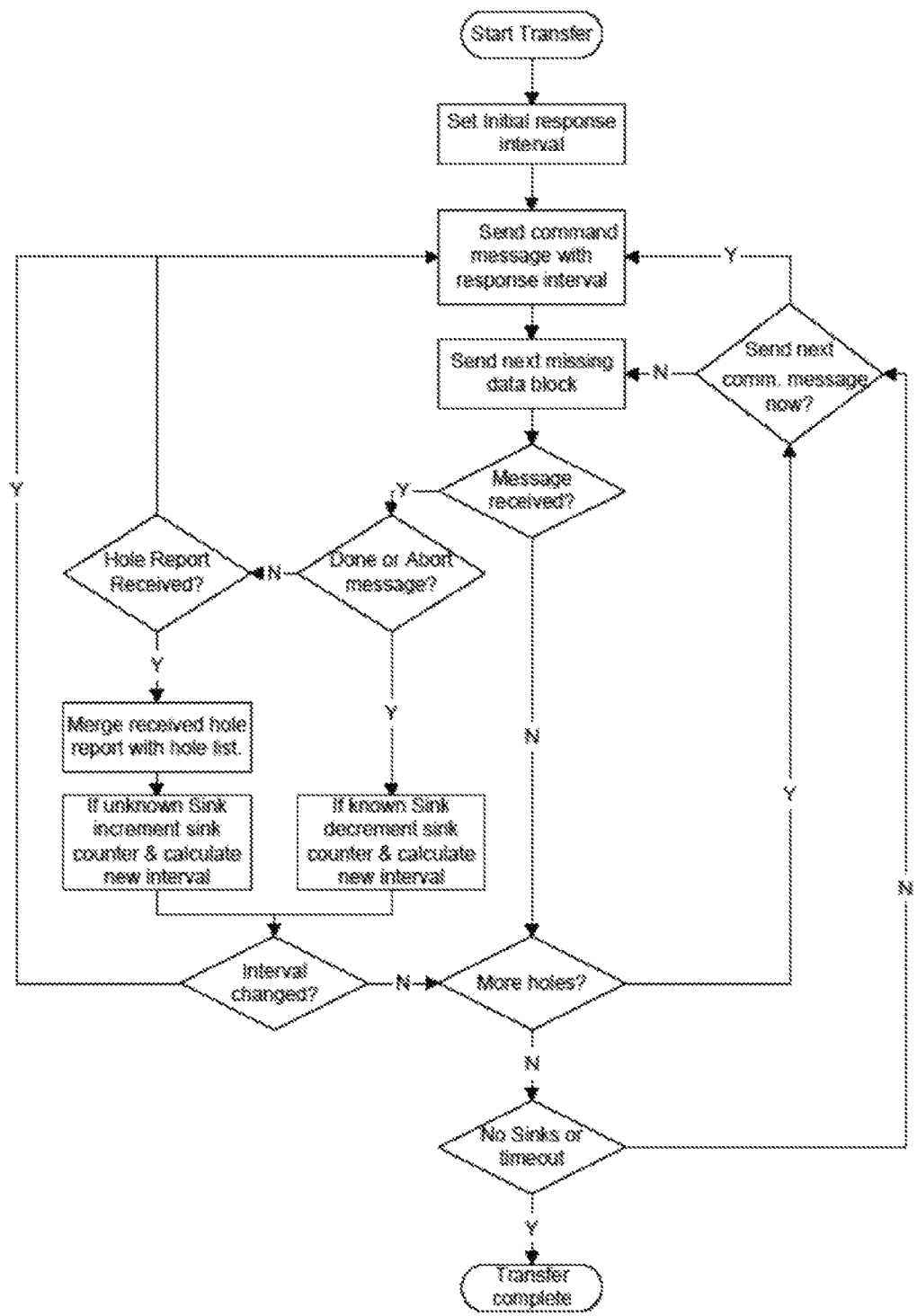
FIG. 6 is a flowchart for operation of a management computer during the update process.

FIG. 6 is a flowchart outlining a general transfer process at a source such as the management computer in FIG. 1 which is sending blocks to one or more sinks such as the mobile radios. Blocks are initially sent in order and then missing blocks are sent according to a priority schedule until all of the active sinks have responded with an indication that a full set has been received. The source initially estimates the number of active sinks and calculates an initial response interval. A command message containing the interval is then transmitted, along with other information such as the overall number of blocks. An interval between command messages is also determined and may be revised during the process. Block messages are then sent by the source until the next command message is required.

During each response interval the source receives messages from the sinks containing individual hole reports which are used to determine the schedule for resending blocks. These messages are also used to revise the estimate of the number of active terminals and calculate further response intervals. Messages indicating that a particular sink can no longer receive blocks ("abort") or that the sink now has a complete set of blocks ("done") cause the number of active sinks to be decremented. Eventually the process ends when the number of holes and the number of active terminals has decreased to zero. A timeout may also be used to terminate the process.

Figure 7:
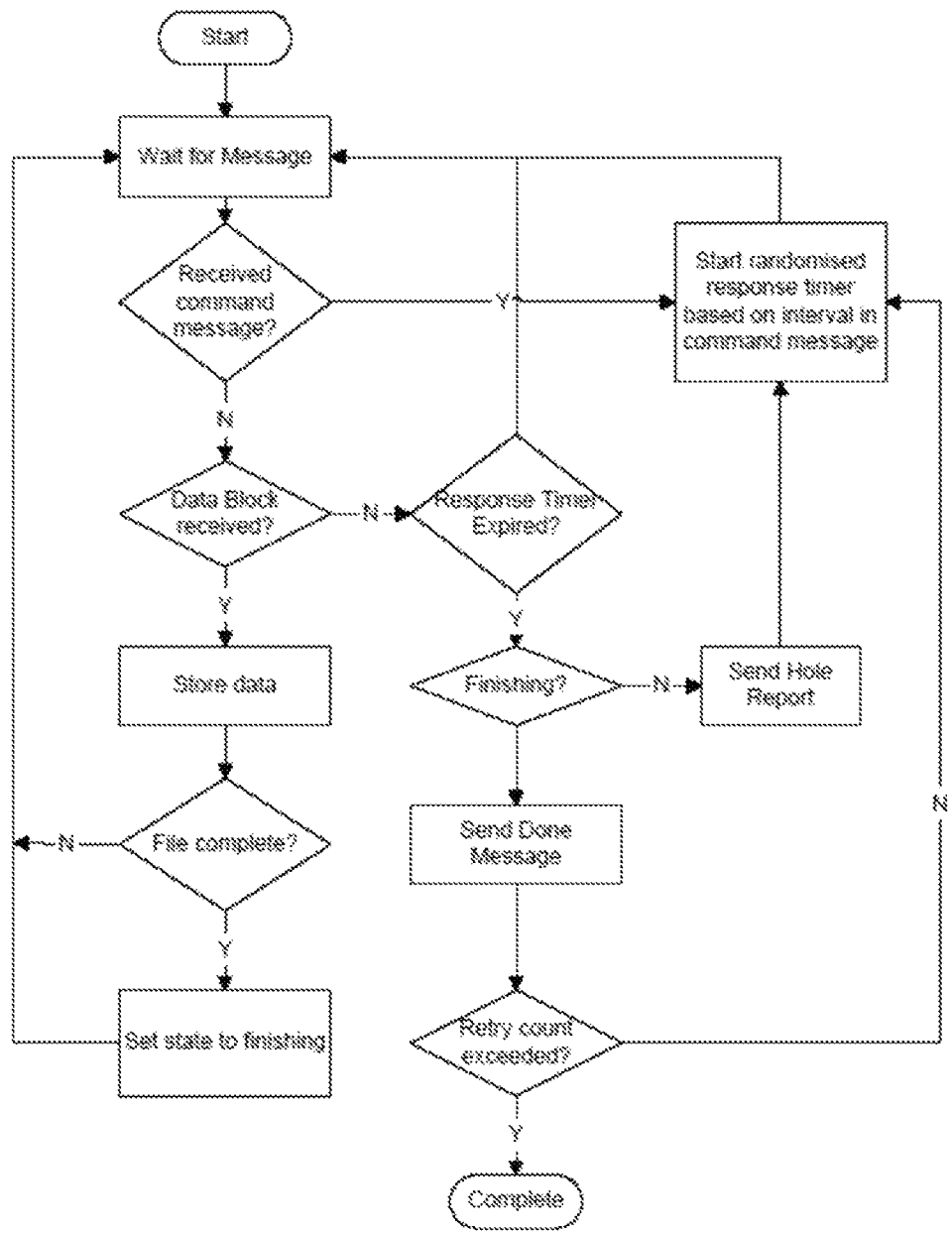
FIG. 7 is a flowchart for operation of a terminal during the update process.

FIG. 7 is a flowchart outlining a general transfer process at a sink which is receiving blocks from a source such as the management computer in FIG. 1. The process is controlled by the command messages which are received at intervals from the source. Each command message contains a response interval within which the sink is required to acknowledge the message and provide a report indicating blocks which have not been properly received. The acknowledgement is randomly timed within the response interval in order to reduce collisions with corresponding messages from other sinks. Blocks are received and stored until a full set has been received and a finishing message ("done") can be sent.

Figure 8:
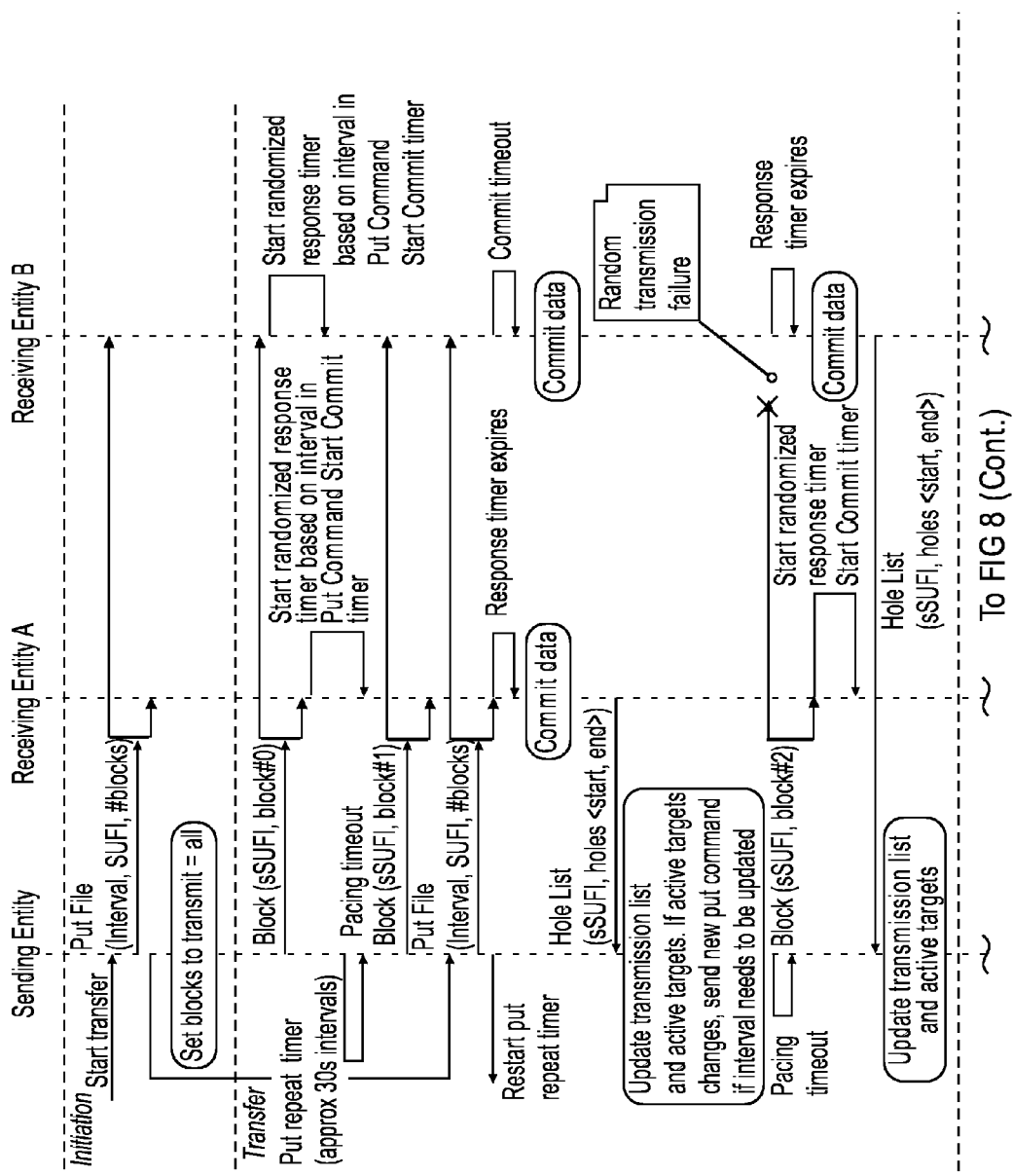
FIG. 8 is a sequence diagram showing an update process in a mobile radio network.
Figure 8:
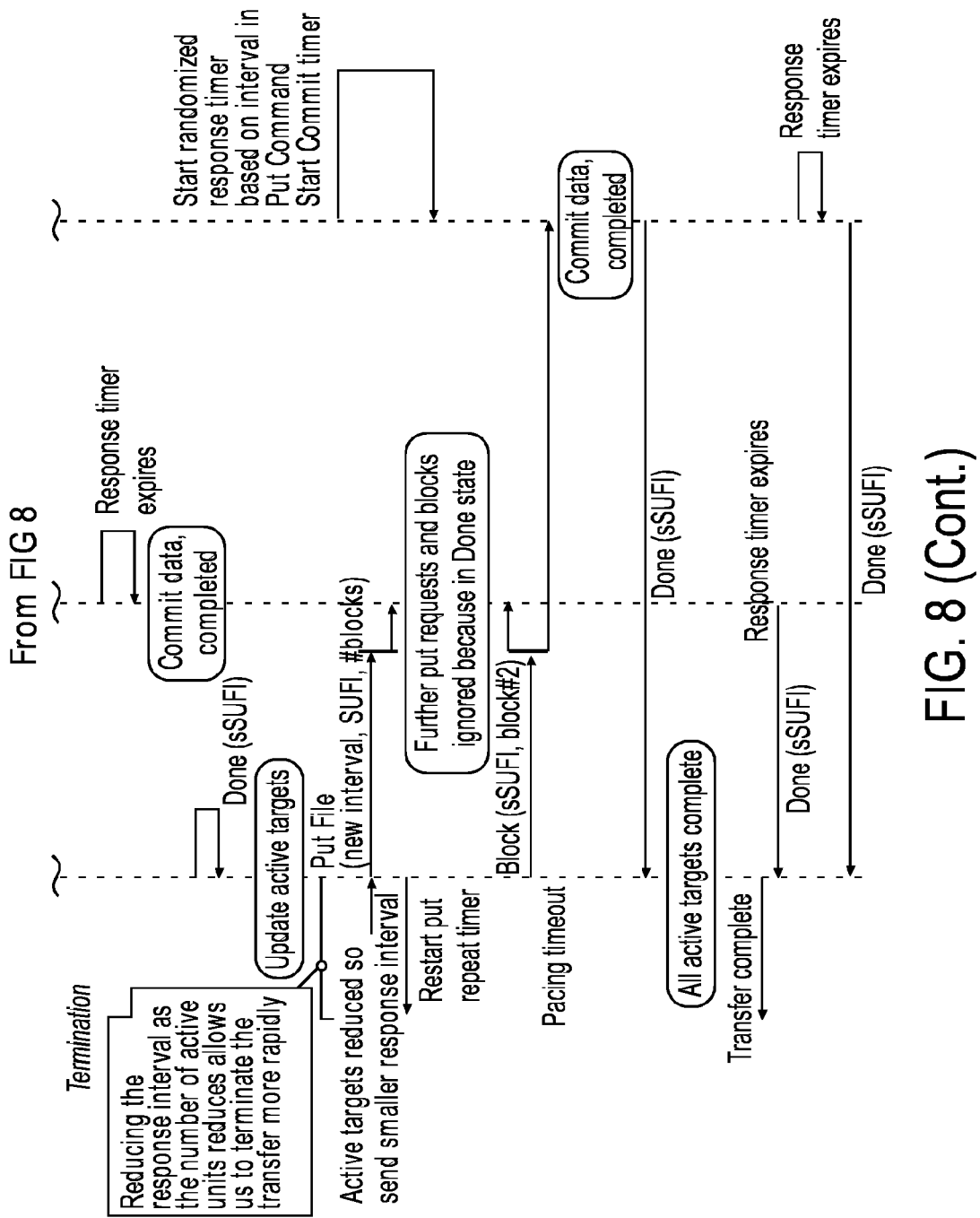

FIG. 8 is a sequence diagram showing messages transmitted between a source entity and two sink entities A, B during a simple update process as outlined above. During an initiation stage the source broadcasts an initial command message ("putfile") containing a SUFI, a response interval and the number of blocks. In this example there are just two blocks. A repeat timer is used by the source to determine when the next command message is sent. Randomised response timers are used by the sinks to determine when acknowledgements will be sent, as explained in relation to FIGS. 6 and 7.

During a transfer stage, block messages containing a shortened SUFI, and individual blocks and block numbers are then broadcast. Each sink receives some or all of the block messages and sends a response ("hole list") to each command message which indicates missing blocks. Sink B misses block 2 in this example. The source also uses these responses to monitor the number of active sinks. The response interval is reduced in accord with a decreasing number of active sinks.

During a termination stage, the source continues to send messages containing the missing blocks until each sink has sent a finishing message ("done") and transfer of the file is considered complete.

It will be appreciated that the blocks can be transmitted by the management computer in a range of different ways. The blocks are preferably sent in series until the end of the file is reached. Holes can then be filled according to the order in which requests are received for example, or according to the number or frequency of requests which are received for particular blocks.

It will also be appreciated that information relating to the response interval can be transmitted in a range of different ways. Command messages containing the information are preferably sent from time to time, and these messages indicate the start of the interval, as outlined above. Alternatively the information can be sent in separate messages or with some or all of the messages containing the blocks themselves.

What is claimed is:

1. A method of broadcasting a file in a wireless network comprising one or more terminals, including:
   a) dividing said file into a set of blocks;
   b) calculating a current response interval based on the number of terminals in the wireless network which are participating in an update process and which require blocks of said file;
   c) transmitting information relating to the current response interval to the terminals;
   d) transmitting blocks to the terminals;
   e) receiving responses from the terminals, within the current response interval, relating to missing or imperfect blocks;
   f) determining from the responses which blocks are still required by one or more of the terminals; and
   g) repeating steps (b) to (f) with respect to said file and decreasing the current response interval in step (b) in accordance with a reducing number of terminals in said wireless network which require blocks of said file until all of the terminals have received a complete set of blocks for said file or are inactive.

2. The method according to claim 1, wherein each new current response interval calculated in step (b) is shorter than a previous interval as the number of terminals is reduced.

3. The method according to claim 1, wherein each of the current response intervals is calculated in proportion to the number of terminals.

4. The method according to claim 1, wherein the information relating to the current response interval is transmitted in command messages which are sent separately from messages containing the blocks.

5. The method according to claim 1, wherein the information relating to the current response interval is sent with messages containing the blocks.

6. The method according to claim 1, wherein the terminals respond randomly within the current response interval.

7. The method according to claim 1, wherein terminals which do not respond within a predetermined number of current response intervals are considered inactive.

8. The method according to claim 1, wherein response messages from terminals include "update complete" or "update end" messages after which the respective terminal is considered inactive.

9. A management system for a mobile radio network comprising one or more terminals, including:
   a processor; and
   a memory coupled to the processor to store instructions, which when executed from the memory, cause the processor to:
   a) divide a file into a set of blocks for transmission;
   b) calculate a current response interval based on the number of terminals which are participating in an update process and which require blocks of said file;
   c) transmit information relating to the current response interval to the terminals, d) transmit blocks to the terminals;
   e) receive responses from the terminals, within the current response interval, relating to missing or imperfect blocks;
   f) determine from the responses which blocks are still required by one or more of the terminals; and
   g) repeat steps (b) to (f) with respect to said file and decrease the current response interval in step (b) in accordance with a reducing number of terminals in said wireless network which require blocks of said file until all of the terminals have received a complete set of blocks for said file or are inactive.

10. The system according to claim 9,. wherein each new current response interval calculated in step (b) is shorter than a previously calculated current response interval as the number of terminals is reduced.

11. The system according to claim 9,. wherein each of the current response intervals is calculated in proportion to the number of terminals.

\* \* \* \* \*